(12) United States Patent
Martin et al.

(10) Patent No.: US 7,120,747 B2
(45) Date of Patent: Oct. 10, 2006

(54) LOWER OVERHEAD SHARED CACHE INVALIDATIONS

(75) Inventors: Brian K. Martin, Cary, NC (US); Martin J. C. Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 10/800,809

(22) Filed: Mar. 15, 2004

(65) Prior Publication Data

US 2005/0204098 A1    Sep. 15, 2005

(51) Int. Cl.
*G06F 12/00* (2006.01)

(52) U.S. Cl. .................. 711/130; 711/216; 711/135

(58) Field of Classification Search .............. 711/216, 711/135, 130, 118, 119, 141, 144
See application file for complete search history.

(56) References Cited

U.S. PATENT DOCUMENTS

| | | | |
|---|---|---|---|
| 5,515,522 A | 5/1996 | Bridges et al. | |
| 5,530,958 A | 6/1996 | Agarwal et al. | |
| 5,860,153 A * | 1/1999 | Matena et al. | 711/216 |
| 5,895,488 A | 4/1999 | Loechel | |
| 5,909,699 A | 6/1999 | Sarangdhar et al. | |
| 6,253,285 B1 | 6/2001 | Razdan et al. | |
| 6,553,411 B1 | 4/2003 | Dias et al. | |
| 6,618,792 B1 | 9/2003 | Perrin et al. | |
| 2002/0166031 A1 | 11/2002 | Chen et al. | |
| 2003/0115420 A1 | 6/2003 | Tsirigotis et al. | |

FOREIGN PATENT DOCUMENTS

EP    0 881 581 A1    12/1998

OTHER PUBLICATIONS

IBM Technical Disclosure Bulletin, Efficient, Approximate Cache Invalidation for an Object Server, Jan. 1994, vol. 37, Issue No. 1, pp. 325-326.*
IBM Technical Disclosure Bulletin, Peir et al., "Selective Invalidation Scheme for Software MP Cache Coherence Control", vol. 35, No. 3, Aug. 1992.

* cited by examiner

*Primary Examiner*—Kimberly McLean-Mayo
(74) *Attorney, Agent, or Firm*—A. Bruce Clay; Hoffman, Warnick & D'Alessandro LLC

(57) ABSTRACT

Under the present invention, a system, method, and program product are provided for reducing the overhead of cache invalidations in a shared cache by transmitting a hashed code of a key to be invalidated. The method for shared cache invalidation comprises: hashing a key corresponding to an object in a first cache that has been modified or deleted to provide a hashed code of the key, wherein the first cache forms part of a shared cache; transmitting the hashed code of the key to other caches in the shared cache; comparing the hashed code of the key with entries in the other caches; and dropping any keys in the other caches having a hash code the same as the hashed code of the key.

16 Claims, 4 Drawing Sheets

LOWER OVERHEAD SHARED CACHE INVALIDATIONS

BACKGROUND OF THE INVENTION

1. Field of the Invention

The present invention generally relates to caching. More particularly, the present invention provides a method, system and program product for reducing the overhead of cache invalidations in a shared cache (e.g., a cache cluster) by transmitting a hashed code of a key to be invalidated rather than the entire key.

2. Related Art

Caching is used in many systems to reduce access time to data. In a clustered environment, caches are often distributed among multiple systems in a cluster. A group of caches in a cluster that all cache the same data are called "peers." To provide cache consistency among peers, caches may send invalidation messages to their peers when an object associated with a key is modified or deleted from the cache.

Sending an invalidation to peers in current shared cache systems involves sending the entire key of the object to be invalidated. In Java, as shown in the flow diagram of FIG. 1, this is typically done by serializing the key (step S1), transmitting the serialized version of the key to each peer (step S2), and deserializing the received serialized version of the key at each peer (step S3). The key received by each peer is subsequently discarded from the cache (step S4). Unfortunately, there is a processing overhead in the serialization/deserialization of the key. Further, the entire key must be transmitted, which consumes extra network bandwidth. As such, there is a need to reduce the processing and bandwidth overhead of cache invalidations in a shared cache.

SUMMARY OF THE INVENTION

In general, the present invention provides a method, system, and program product for reducing the overhead of cache invalidations in a shared cache by transmitting a hashed code of a key to be invalidated rather than the entire key.

A first aspect of the present invention is directed to a method for shared cache invalidation, comprising: hashing a key corresponding to an object in a first cache that has been modified or deleted to provide a hashed code of the key, wherein the first cache forms part of a shared cache; transmitting the hashed code of the key to other caches in the shared cache; comparing the hashed code of the key with entries in the other caches; and dropping any keys in the other caches having a hash code the same as the hashed code of the key.

A second aspect of the present invention is directed to a method for shared cache invalidation, comprising: hashing a key corresponding to an object in a cache that has been modified or deleted to provide a hashed code of the key, wherein the cache forms part of a shared cache; and transmitting the hashed code of the key to other caches in the shared cache for invalidation processing.

A third aspect of the present invention is directed to a method for shared cache invalidation, comprising: receiving at a cache a hashed code of a key, wherein the hashed code of the key corresponds to an object that has been modified or deleted in another cache; and performing invalidation processing on the cache based on the received hashed code of the key.

A fourth aspect of the present invention is directed to a system for shared cache invalidation, comprising: a system for hashing a key corresponding to an object in a cache that has been modified or deleted to provide a hashed code of the key, wherein the cache forms part of a shared cache; and a system for transmitting the hashed code of the key to other caches in the shared cache for invalidation processing.

A fifth aspect of the present invention is directed to a system for shared cache invalidation, comprising: a system for receiving at a cache a hashed code of a key, wherein the hashed code of the key corresponds to an object that has been modified or deleted in another cache; and a system for performing invalidation processing on the cache based on the received hashed code of the key.

A sixth aspect of the present invention is directed to a program product for shared cache invalidation stored on a recordable medium, which when executed, comprises: program code for hashing a key corresponding to an object in a cache that has been modified or deleted to provide a hashed code of the key, wherein the cache forms part of a shared cache; and program code for transmitting the hashed code of the key to other caches in the shared cache for invalidation processing.

A seventh aspect of the present invention is directed to a program product for shared cache invalidation stored on a recordable medium, which when executed, comprises: program code for receiving at a cache a hashed code of a key, wherein the hashed code of the key corresponds to an object that has been modified or deleted in another cache; and program code for performing invalidation processing on the cache based on the received hashed code of the key.

BRIEF DESCRIPTION OF THE DRAWINGS

These and other features of this invention will be more readily understood from the following detailed description of the various aspects of the invention taken in conjunction with the accompanying drawings in which.

Figure 1:
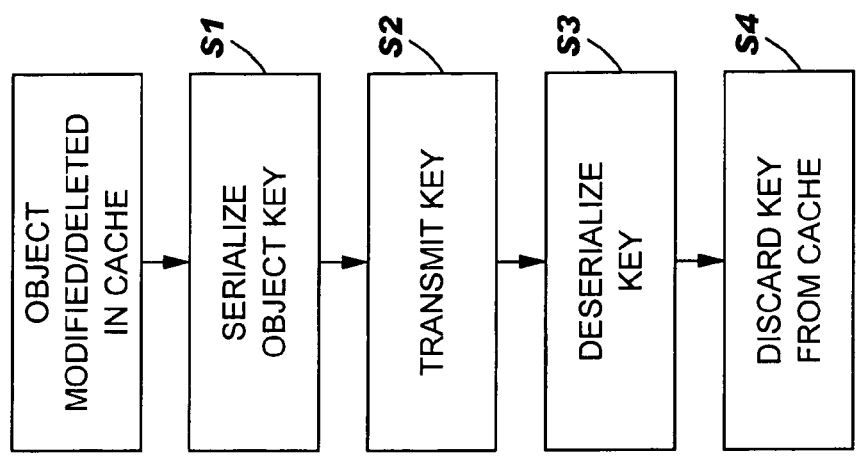
FIG. 1 depicts a flow diagram of a cache invalidation method in accordance with the prior art, in which an entire key is serialized/deserialized.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for reducing the overhead of cache invalidations in a shared cache by transmitting a hashed code of a key to be invalidated. It is assumed for the purposes of this description that the reader has an understanding of caches, cache indexing, shared cache systems, cache invalidation techniques, Java, and hashing commensurate with one skilled in the art. Accordingly, a detailed description of these topics is not provided herein.

Figure 2:
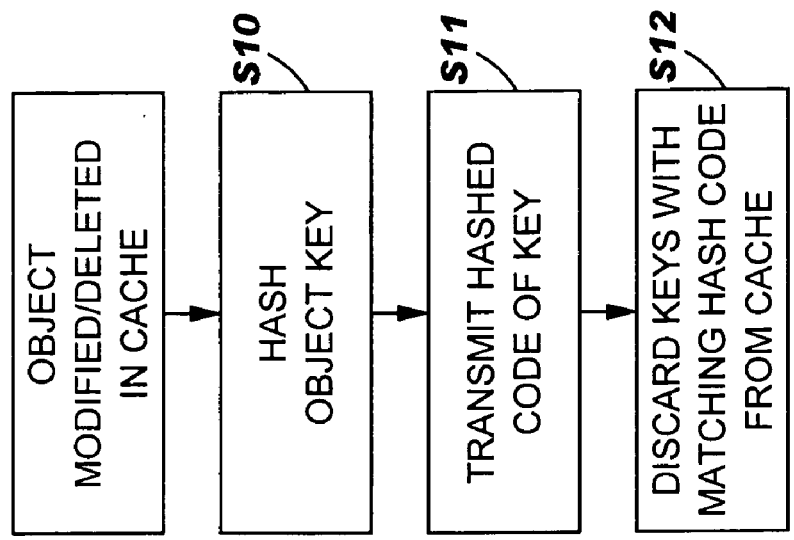
FIG. 2 depicts a flow diagram of a cache invalidation method using a hashed code of a key, in accordance with the present invention.

Referring now to FIG. 2, there is illustrated a flow diagram of a cache invalidation method using a hashed code of a key in accordance with the present invention. In step S10, a key corresponding to a cached object that has been modified or deleted in a cache is hashed using a hashing algorithm. Any suitable hashing algorithm now known or later developed may be utilized in the practice of the present invention. In step S1 of FIG. 1, the serialized key may have a size of tens of bytes to hundreds of bytes. The hashed code of the key of the present invention produced in step S10 of FIG. 2, however, may typically have a length of four or eight bytes. As such, the hashed code of the key of the present invention has a much shorter length than a corresponding serialized key, and a corresponding lower bandwidth consumption when transmitted.

In step S11 of FIG. 2, the hashed code of the key is transmitted to each peer of the cache. The manner of transmission (e.g., via a hard-wired connection, via the Internet, etc.) is dependent upon the specific configuration of the shared cache.

The present invention takes advantage of the fact that caches commonly index entries using hash codes. In particular, in step S12 of FIG. 2, upon receiving the hashed code of the key, each peer cache drops all keys having the same hash code. Since two equivalent keys must have the same hash code, each peer cache is guaranteed of invalidating the desired key. Thus, by using the hashed code of the key, the process of locating matching keys in each peer cache is greatly simplified. In addition, processing requirements are reduced relative to the serializing/deserializing process of the prior art.

There is a small possibility that extra keys may also be invalidated. However, this is extremely unlikely given the typical range of hash values compared to typical cache sizes. That is, cache keys can typically be hashed to a numeric hash code having a range much larger than the typical cache size. For example, on 32-bit hardware, Java objects can generate a hash code with a range of approximately four billion options (i.e., $4 \times 10^9$), while caches often contain only thousands or tens of thousands of objects. Regardless, even if an extra key is accidentally invalidated, the cache still operates correctly: caches can arbitrarily and capriciously discard entries whenever they wish.

Figure 3:
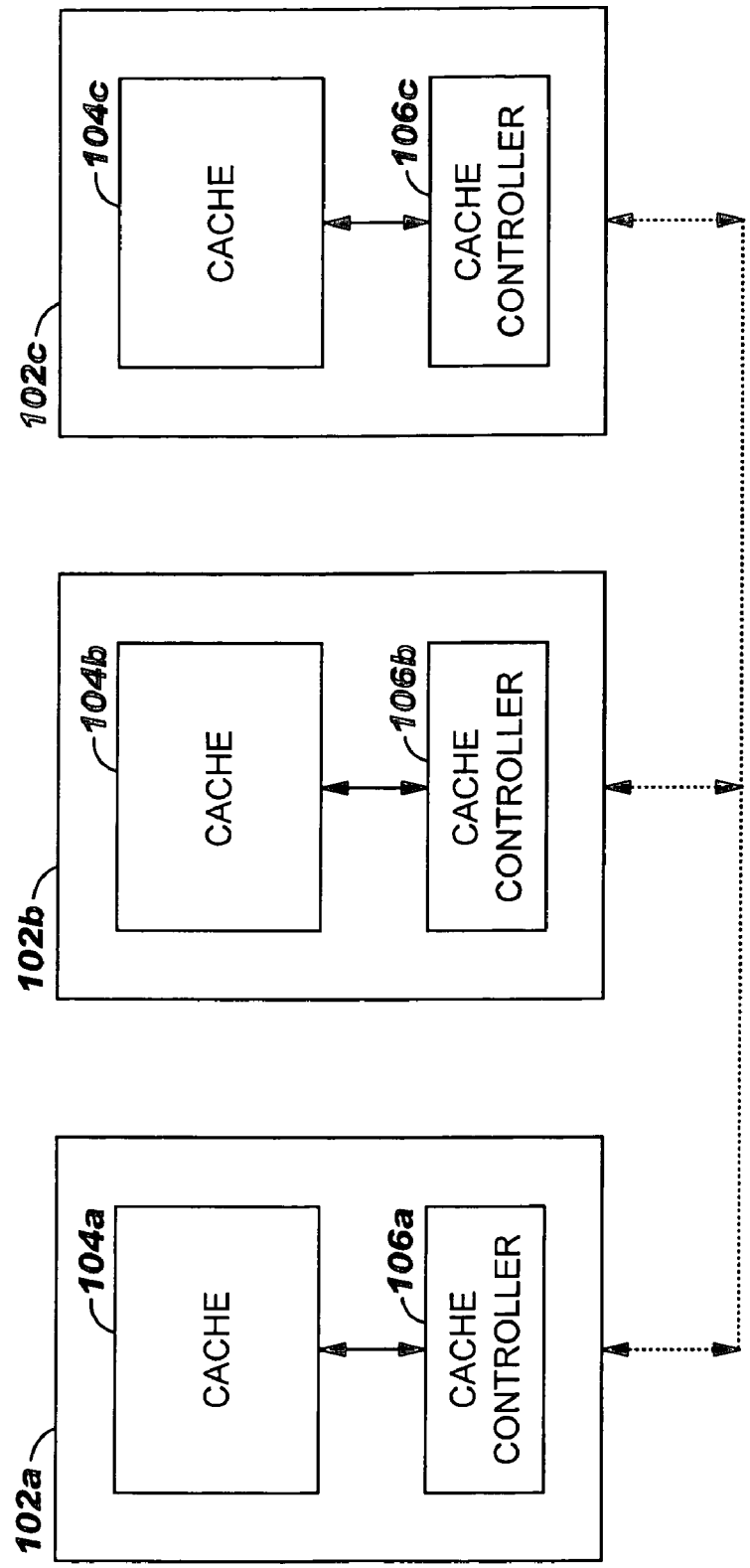
FIG. 3 depicts an illustrative shared cache system comprising a plurality of application servers, in which the method of the present invention may be utilized.

An illustrative shared cache system 100 in which the method of the present invention may be utilized is illustrated in FIG. 3. In this example, the shared cache system 100 comprises three application servers 102a, 102b, and 102c. Although shown as including three application servers 102a, 102b, and 102c, it will be apparent that the shared cache system 100 may comprise any plurality of application servers. Also, it should be understood that the architecture shown in FIG. 3 is illustrative only and will likely include other known components not shown. Further, it will be appreciated that the present invention can be used to lower the processing and bandwidth overhead of shared cache invalidations in many other types of systems that include a shared/distributed cache including, for example, web servers, databases, etc.

Each application server 102a, 102b, and 102c comprises a cache 104a, 104b, and 104c, and a cache controller 106a, 106b, and 106c, respectively. The application servers 102a, 102b, and 102c can be interconnected (as shown in phantom) in any known or later developed manner. In this example, it is assumed that an object stored in the cache 104a of application server 102a has been modified or deleted. In response thereto, the cache controller 106a accesses and hashes the key of the modified/deleted object to provide a hashed code of the key. The cache controller 106a then transmits the hashed code of the key to the other cache peers (e.g., application servers 102b and 102c) in the shared cache system 100. Upon receipt of the hashed code of the key from the application server 102a, the cache controller 106b of application server 102b compares the hashed code of the key with the entries in the cache 104b and drops all keys having the same hash code. Likewise, upon receipt of the hashed code of the key from the application server 102a, the cache controller 106c of application server 102c compares the hashed code of the key with the entries in the cache 104c and drops all keys having the same hash code.

Figure 4:
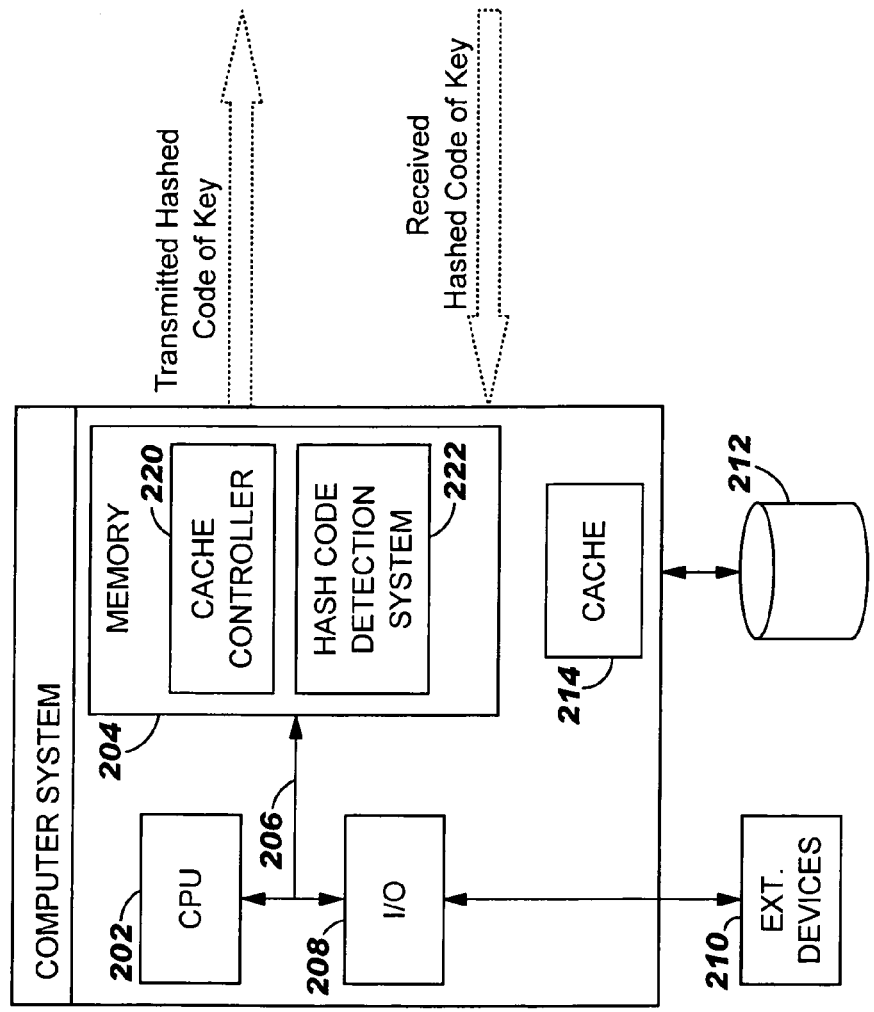
FIG. 4 illustrates an example of a computerized system capable of implementing the present invention.

Referring now to FIG. 4, a computer system 200 capable of implementing the method of the present invention is illustrated in detail. The computer system 200 represents, for example, a portion of a shared cache system, such as one of the application servers 102 shown in FIG. 3. As shown, the computer system 200 generally comprises a central processing unit (CPU) 202, memory 204, bus 206, input/output (I/O) interfaces 208, external devices/resources 210, storage unit 212, and a shared cache 214. CPU 202 may comprise a single processing unit, or may be distributed across one or more processing units in one or more locations. Memory 204 may comprise any known type of data storage and/or transmission media, including magnetic media, optical media, random access memory (RAM), read-only memory (ROM), a data cache, a data object, etc. Moreover, similar to CPU 202, memory 204 may reside at a single physical location, comprising one or more types of data storage, or may be distributed across a plurality of physical systems in various forms.

I/O interfaces 208 may comprise any system for exchanging information to/from an external source. External devices/resources 210 may comprise any known type of external device, including speakers, a CRT, LCD screen, handheld device, keyboard, mouse, voice recognition system, speech output system, printer, monitor/display, facsimile, pager, etc. Bus 206 provides a communication link between each of the components in computer system 200 and likewise may comprise any known type of transmission link, including electrical, optical, wireless, etc.

Storage unit 212 can be any system capable of providing storage for information necessary for the practice of the present invention. As such, storage unit 212 may reside at a single physical location, comprising one or more types of data storage, or may be distributed across a plurality of physical systems in various forms. In another embodiment, storage unit 212 may be distributed across, for example, a local area network (LAN), wide area network (WAN) or a storage area network (SAN) (not shown).

Shown in memory 204 of computer system 200 is a cache controller 220, which may be provided as computer program product. The cache controller 220 is provided to determine when an object in the shared cache 214 has been modified or deleted. In response thereto, the cache controller 220 accesses the key of the modified or deleted object and hashes the key to provide a hashed code of the key. The cache controller 220 then transmits the hashed code of the key to the other cache peers in the shared cache system. Upon receipt of a hashed code of the key from any of the other cache peers in the shared cache system, the cache controller 220 compares the received hashed code of the key with the entries in the shared cache 214 and drops all keys having the same hash code.

If a shared cache is going to use the present invention in an environment where the same key may give different hash codes on different nodes in the cluster, then the invention may not be applicable. One example where this can occur is in a cluster of Java applications where different nodes run on different hardware platforms; in that case, the hash code for a given key may be different. However, a cache can be configured to include a detection system (e.g., hash code detection system 222, FIG. 4) to automatically detect this for each type of key inserted into the cache by computing the hash code for the key, and then sending the key and its hash code to all its peer caches, which also hash the same key. If the peer caches also compute the same hash code, then the invention can safely be applied for this type of key. If different hash codes result, then this invention is not applicable for the specified key type. This could be done once per peer in the cluster, to detect if this invention is safe to use.

It should be understood that the present invention can be realized in hardware, software, or a combination of hardware and software. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for shared cache invalidation, comprising:
   hashing a key corresponding to an object in a first cache that has been modified or deleted to provide a hashed code of the key, wherein the first cache forms part of a shared cache;
   transmitting only the hashed code of the key to other caches in the shared cache;
   comparing the hashed code of the key with entries in the other caches; and
   dropping any keys in the other caches having a hash code the same as the hashed code of the key.

2. The method of claim 1, further comprising:
   receiving at the first cache a hashed code of a key from one of the other caches in the shared cache corresponding to an object that has been modified or deleted;
   comparing the received hashed code of the key with entries in the first cache; and
   dropping any keys in the first cache having a hash code the same as the received hashed code of the key.

3. The method of claim 1, wherein entries in the other caches of the shared cache are indexed using hash codes.

4. A method for shared cache invalidation, comprising:
   hashing a key corresponding to an object in a cache that has been modified or deleted to provide a hashed code of the key, wherein the cache forms part of a shared cache; and
   transmitting only the hashed code of the key to other caches in the shared cache for invalidation processing.

5. The method of claim 4, wherein the invalidation processing further comprises:
   comparing the received hashed code of the key with entries in the other caches; and
   dropping any keys in the other caches having a hash code the same as the hashed code of the key.

6. A method for shared cache invalidation, comprising:
   hashing a key corresponding to an object in a cache that has been modified or deleted to provide a hashed code of the key, wherein the cache forms part of a shared cache;
   transmitting the key and the hashed code of the key to the other caches in the shared cache for invalidation processing;
   at each of the other caches in the shared cache:
     hashing the key to provide a second hashed code of the key; and
     comparing the hashed code of the key and the second hashed code of the key;
     wherein the method for shared cache invalidation is not applicable to the key if the hashed code of the key and the second hashed code of the key are not the same at any of the other caches.

7. A method for shared cache invalidation, comprising:
   receiving at a cache a key and a hashed code of the key, wherein the hashed code of the key corresponds to an object that has been modified or deleted in another cache;
   performing invalidation processing on the cache based on the received hashed code of the key;
   hashing the key to provide a second hashed code of the key; and
   comparing the hashed code of the key and the second hashed code of the key;
   wherein the invalidation processing is not performed if the hashed code of the key and the second hashed code of the key are not the same at any of the other caches.

8. The method of claim 7, wherein the invalidation processing further comprises:
   comparing the received hashed code of the key with entries in the cache; and
   dropping any keys in the cache having a hash code the same as the received hashed code of the key.

9. A system for shared cache invalidation, comprising:
   a system for hashing a key corresponding to an object in a cache that has been modified or deleted to provide a hashed code of the key, wherein the cache forms part of a shared cache; and
   a system for transmitting only the hashed code of the key to other caches in the shared cache for invalidation processing.

10. The system of claim 9, further comprising a system for providing the invalidation processing at the other caches, wherein the system for providing the invalidation processing comprises:
    a system for comparing the hashed code of the key with entries in the other caches; and a system for dropping any keys in the other caches having a hash code the same as the hashed code of the key.

11. A system for shared cache invalidation, comprising:
a system for receiving at a cache a key and a hashed code of the key, wherein the hashed code of the key corresponds to an object that has been modified or deleted in another cache;
a system for performing invalidation processing on the cache based on the received hashed code of the key;
a system for hashing the key to provide a second hashed code of the key; and
a system for comparing the hashed code of the key and the second hashed code of the key;
wherein the invalidation processing is not performed if the hashed code of the key and the second hashed code of the key are not the same at any of the other caches.

12. The system of claim 11, wherein the system for performing invalidation processing further comprises:
a system for comparing the received hashed code of the key with entries in the cache; and
a system for dropping any keys in the cache having a hash code the same as the received hashed code of the key.

13. A program product for shared cache invalidation stored on a recordable medium, which when executed, comprises:
program code for hashing a key corresponding to an object in a cache that has been modified or deleted to provide a hashed code of the key, wherein the cache forms part of a shared cache; and
program code for transmitting only the hashed code of the key to other caches in the shared cache for invalidation processing.

14. The program product of claim 13, further comprising program code for invalidation processing, the program code for invalidation processing comprising:
program code for comparing the received hashed code of the key with entries in the other caches; and
program code for dropping any keys in the other caches having a hash code the same as the hashed code of the key.

15. A program product for shared cache invalidation stored on a recordable medium, which when executed, comprises:
program code for receiving at a cache a key and a hashed code of a the key, wherein the hashed code of the key corresponds to an object that has been modified or deleted in another cache;
program code for performing invalidation processing on the cache based on the received hashed code of the key;
program code for hashing the key to provide a second hashed code of the key; and
program code for comparing the hashed code of the key and the second hashed code of the key;
wherein the invalidation processing is not performed if the hashed code of the key and the second hashed code of the key are not the same at any of the other caches.

16. The program product of claim 14, wherein the program code for performing invalidation processing further comprises:
program code for comparing the received hashed code of the key with entries in the cache; and
program code for dropping any keys in the cache having a hash code the same as the received hashed code of the key.

* * * * *